United States Patent [19]
Anzai et al.

[11] 3,921,046
[45] Nov. 18, 1975

[54] ELEVATOR SPEED CONTROL APPARATUS
[75] Inventors: Nobuo Anzai; Hiroshi Kamaike, both of Inazawa, Japan
[73] Assignee: Mitsubishi Denki Kabushiki Kaisha, Tokyo, Japan
[22] Filed: Dec. 18, 1973
[21] Appl. No.: 425,720

[30] Foreign Application Priority Data
Dec. 18, 1972   Japan............................. 47-126904

[52] U.S. Cl.............. 318/203 R; 318/212; 318/227; 318/230; 187/29 R
[51] Int. Cl.² ........................................... H02P 1/40
[58] Field of Search........ 318/203 R, 204, 211, 212, 318/227, 230; 187/29 R

[56] References Cited
UNITED STATES PATENTS

| | | | |
|---|---|---|---|
| 3,514,682 | 5/1970 | Corey | 318/212 |
| 3,596,156 | 7/1971 | Davey | 318/203 R |
| 3,678,355 | 7/1972 | Bucek et al. | 318/203 R |
| 3,708,734 | 1/1973 | Rowe | 318/212 |

Primary Examiner—G. Z. Rubinson
Attorney, Agent, or Firm—Oblon, Fisher, Spivak, McClelland & Maier

[57] ABSTRACT

An apparatus comprising a first device having a frequency characteristic for controlling the speed of an elevator cage driven by an induction motor. The cage speed is controlled by changing the voltage applied to the motor according to the output of the first device connected into a control system. The apparatus further comprises a second device capable of cancelling the frequency characteristic of the first device and of generating a signal for setting the output of the first device to a value corresponding to the input to the first device. The signal from the second device is supplied to the first device prior to the deceleration of the cage.

2 Claims, 9 Drawing Figures

F I G. 8
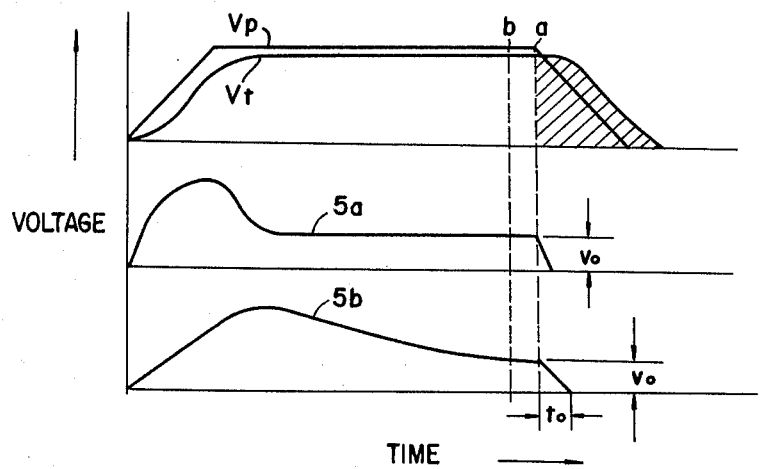
F I G. 9
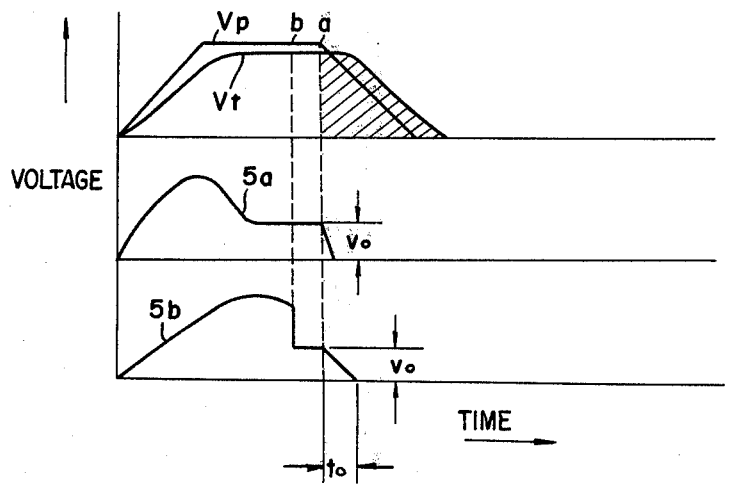

ELEVATOR SPEED CONTROL APPARATUS

BACKGROUND OF THE INVENTION

1. Field of the Invention

The present invention relates to apparatus for controlling the speed of an elevator cage driven by an induction motor.

2. Description of the Prior Art

Automatic control systems of the type dependent on negative feedback have been in use for the purpose of controlling the speed of an elevator cage with high stability and accuracy. As is known in the art, this type of control system generally comprises a device having a frequency characteristic. FIGS. 1 through 6 schematically illustrate an example of such a prior art system, wherein the reference numeral 1 in FIG. 1 denotes a device for generating a speed command signal $V_p$ used for controlling the speed of an elevator cage (not shown) which comprises a power source 1a, normally open contacts 1b through 1e of accelerating and decelerating relays (not shown), resistors 1f and 1g and capacitors 1h and 1k. The contacts 1b and 1e assume successive on-states during acceleration, or off-states during deceleration, whereby the voltage of power source 1a is divided into various signal steps. These signals are passed through a filter comprising resistors 1f and 1g, and capacitors 1h and 1k, to produce a continuous speed command signal $V_p$ across terminals 101 and 100. The reference numeral 2 deontes an adder for adding the speed command signal $V_p$ appearing across terminals 101 and 100 and a speed signal $V_T$ appearing across terminals 102 and 100, $V_T$ being opposite to the signal $V_p$ in polarity and proportional to the speed of the elevator cage. Adder 2 comprises resistors 2a through 2d and an operational amplifier 2e. An amplifier 3 having a frequency characteristic is seen to comprise resistors 3a through 3d, a capacitor 3e, and an operational amplifier 3f. In this circuit, the static gain depends upon the quotient resulting from the division of resistance 3b by resistance 3a, while the frequency characteristic depends upon the resistances 3a to 3c and capacitance 3e. The numeral 4 denotes a distribution circuit comprising resistors 4a to 4c, diodes 4d and 4e, and an operational amplifier 4f. This circuit is capable of generating a negative output across terminals 104 and 100 when the input signal is positive, or across terminals 103 and 100 when the input signal is negative. The output across terminals 104 and 100 is supplied to the gate circuit of a braking thyristor, and the output across terminals 103 and 100 is supplied to the gate circuit of a power-running thyristor.

In FIG. 2, the numeral 7 denotes a turn-on control circuit on the side of the system where the cage is in its power-run mode. This circuit comprises thyristors 40, 50 and 60, gates 40a, 50a and 60a, cathodes 40b, 50b and 60b, and synchronous transformers 51 to 53 operated for the turn-on circuits of thyristors 40, 50 and 60, respectively. The transformer 51 is for the R-phase thyristor 40 and has its primary winding connected to the R- and T-phase lines. The transformer 52 is for the S-phase thyristor 50 and has its primary winding connected to the S- and R-phase lines. The transformer 53 is for the T-phase thyristor 60 and has its primary winding connected to the T- and S-phase lines. These R- S- and T-phase turn-on circuits are exactly the same in construction and hence only the R-phase turn-on circuit for thyristor 40 need be described.

The numeral 54 indicates a magnetic amplifier comprising an output winding 54a, a reset winding 54b, and a control winding 54c. Reference numerals 55 and 58 represent diodes, while 56, 57 and 59 represent resistors, and 40a and 40b indicate output terminals of the turn-on circuit for R-phase thyristor 40. The terminal 40a is connected to the gate 40a of thyristor 40, and the terminal 40b is connected to the cathode 40b thereof. The diode 55 is for blocking the gate inverse voltage while the thyristor 40 is inversely biased. The output voltage of magnetic amplifier 54 is divided through resistors 56 and 57 and is applied to the output terminals 40a and 40b of the turn-on circuit. The diode 58, reset winding 54b and resistor 59 constitute a reset circuit which resets the saturation of magnetic amplifier 54 while the thyristor 40 is inversely biased. A power-running signal from the distribution amplifier 4 is applied across input terminals 103 and 100 and thus a turn-on signal having a phase proportional to the current passing through the control winding 54c is obtained across output terminals 40a and 40b in order to control the thyristor 40.

FIG. 3 shows a circuit similar to the one shown in FIG. 2 wherein like numerals indicate like components, and thus, only different components need be described below. In FIG. 3, the numeral 8 denotes a turn-on control circuit on the braking side, comprising control thyristors 17 and 18, gates 17a and 18a, and cathodes 17b and 18b. The numeral 60 indicates a synchronous signal transformer for the turn-on circuit of thyristor 18, and 61 indicates a synchronous signal transformer for the turn-on circuit of thyristor 17. A braking signal from the distribution amplifier 4 is applied across input terminals 104 and 100 to cause a turn-on signal having a phase proportional to control the thyristors 17 and 18, similar to the foregoing turn-on control circuit 7.

In FIG. 4, the numeral 9 represents an induction motor for driving the elevator, and the reference letters U, V and W represent power source lines for the motor. Three-phase AC power is fed through lines U, V and W to the motor driven for power-running, as well as for full-speed running. For a braking run, a DC voltage is applied to lines V and W. The reference numeral 10 denotes a tachometer generator which is mechanically coupled to the motor 9 and generates across terminals 102 and 100 a voltage $V_T$ proportional to the rotational speed of the motor 9, i.e., the speed of the elevator cage.

The aforedescribed apparatus operates in the following manner. When the motor is actuated by the speed command signal $V_p$, the adder 2 compares the speed signal $V_T$ from the tachometer generator 10 with the speed command signal $V_p$ and generates a resultant difference signal 5a as seen in FIg. 5, which is supplied to a device having a frequency characteristic such as, for example, a delay frequency characteristic, whereby a suitably delayed signal 5b is produced, the thyristor being controlled according to the signal 5b. As a result of this operation, the voltage applied to the motor increases to cause the motor to accelerate. Accordingly, the elevator cage accelerates to a constant speed under the control of speed command signal $V_p$. Then, when the cage speed is desired to be slowed, the speed command signal $V_p$ is generated to decelerate the cage at point a. In this condition, both the signals 5a and 5b are at the same voltage $V_o$. As time elapses, the voltage of signal 5a decreases with the decrease in the voltage of signal 5b and falls to zero $t_o$ seconds after the decleration time $a$. Then the cage begins to decelerate.

An example of a prior art elevator speed control system has been described wherein the cage is decelerated after it is run at a constant speed for a substantial period of time. FIG. 6 is a graphic representation of another system wherein the cage deceleration is started immediately after the cage reaches a given speed. More specifically, at the beginning of deceleration, the signal 5$a$ is at a voltage $V_o$, at the deceleration command point a while the signal 5$b$ is at a voltage $V_1$ which is higher than $V_o$. Then the voltage $V_1$ decreases at a gradient nearly the same as in FIG. 5. Hence, the time $t_1$ that the signal 5$b$ takes to reach zero volts is longer than $t_o$, i.e., $t_1 > t_o$. In other words, it takes the cage a relatively long time to start decelerating after a deceleration command is generated, with the undesirable result that the cage overshoots, or the accuracy with which the cage is eventually positioned adjacent a floor differs by the operating hysteresis. The hatched areas shown in FIGS. 5 and 6 correspond to the cage leveling error.

SUMMARY OF THE INVENTION

Accordingly, a general object of the present invention is to provide a novel and unique elevator speed control apparatus capable of accurately stopping the cage in position by cancelling the frequency characteristic in the control system during the deceleration operation, irrespective of the operating hysteresis.

The foregoing and other objects are attained in accordance with one aspect of the present invention through the provision of an elevator speed control apparatus capable of accurately stopping the cage in position by cancelling the frequency characteristic in the control system during deceleration, regardless of the operating hysteresis. The apparatus comprises a control device having a frequency characteristic which is cancelled before the cage is decelerated, when a certain deceleration decision point is reached, and the output of the control device is set to a value corresponding to its input to maintain a constant deceleration characteristic.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, wherein like reference numerals designate identical or corresponding parts throughout the several views, in which:

FIGS. 8 and 9 are diagrams useful for illustrating the operation of the apparatus of the present invention as shown in FIG. 7.

DETAILED DESCRIPTION OF THE PREFERRED EMBODIMENT

A preferred embodiment of the present invention will now be described by referring to FIGS. 7 through 9.

Figure 7:
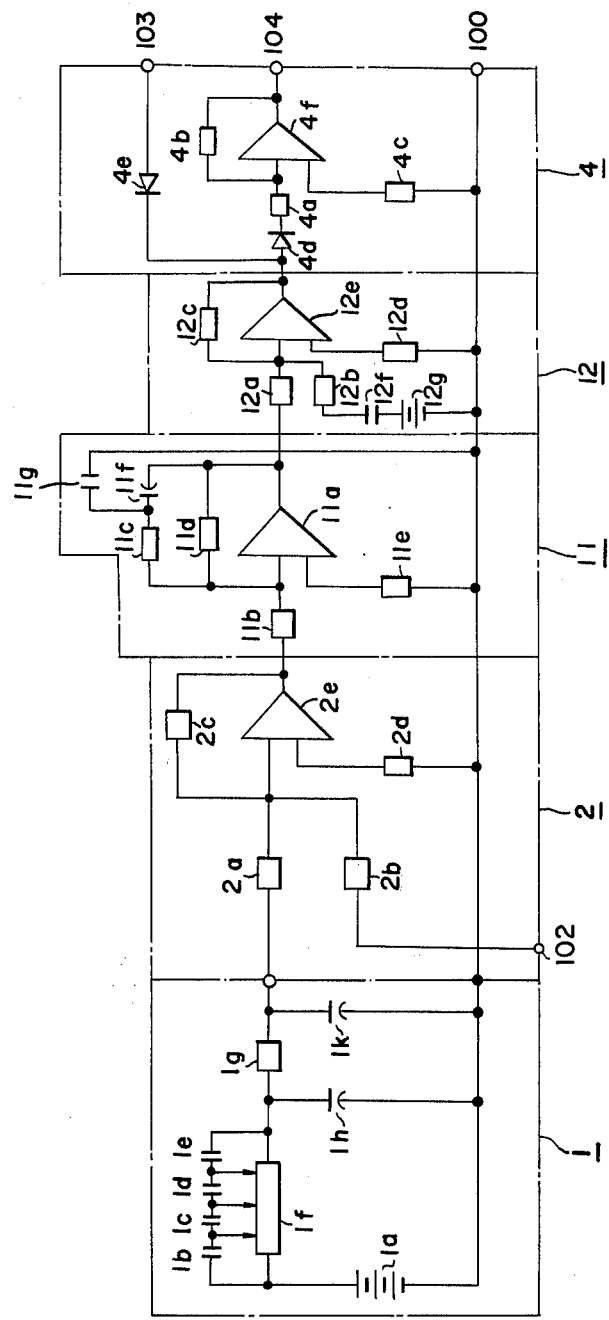
FIG. 7 is a circuit diagram of a preferred embodiment of the present invention which shows a device which generates an elevator speed command signal and a computing device.

In FIG. 7, the reference numeral 11 indicates a circuit comprising a device having a frequency characteristic, and a device for cancelling the frequency characteristic thereof. The device 11 comprises an operational amplifier 11$a$, resistors 11$b$ through 11$e$, a capacitor 11$f$, and a normally open contact 11$g$ of an operation relay (not shown) which is energized for a certain period during which the cage approaches a deceleration command point until it reaches the deceleration command point, and which is otherwise de-energized. The contact 11$g$ has one end thereof connected to the capacitor 11$f$, the other end thereof being grounded.

Reference numeral 12 signifies a saturation signal generating device comprising resistors 12$a$ through 12$d$, an operational amplifier 12$e$, a normally open contact 12$f$ of a relay (not shown) which is energized at the end of acceleration and which is de-energized at the beginning of deceleration, and a power source 12$g$. This circuit operates in the following manner. When the contact 12$f$ is open, the output of the amplifier 11 is yielded directly as an output of the saturation signal generating device 12. When the contact 12$f$ is closed, the foregoing gate circuits on the power running side become saturated irrespective of the output of the amplifier 11.

In this apparatus, the contact 11$g$ is open while the cage is being accelerated. Therefore, the transfer characteristic from the output of the adder 2 to the output of the device 11 can be given as $$\frac{R_3}{R_1} \times \frac{1 + R_2 CS}{1 + (R_2 + R_3)CS} \qquad (1)$$

where
 $R_1$, $R_2$ and $R_3$ = the resistance values of resistors 11$b$, 11$c$ and 11$d$, respectively;
 $C$ = the capacitance of capacitor 11$f$; and
 $S$ = Laplace's operator.

As shown above, this transfer characteristic has a frequency characteristic which serves to make the control system stable.

Figure 1:
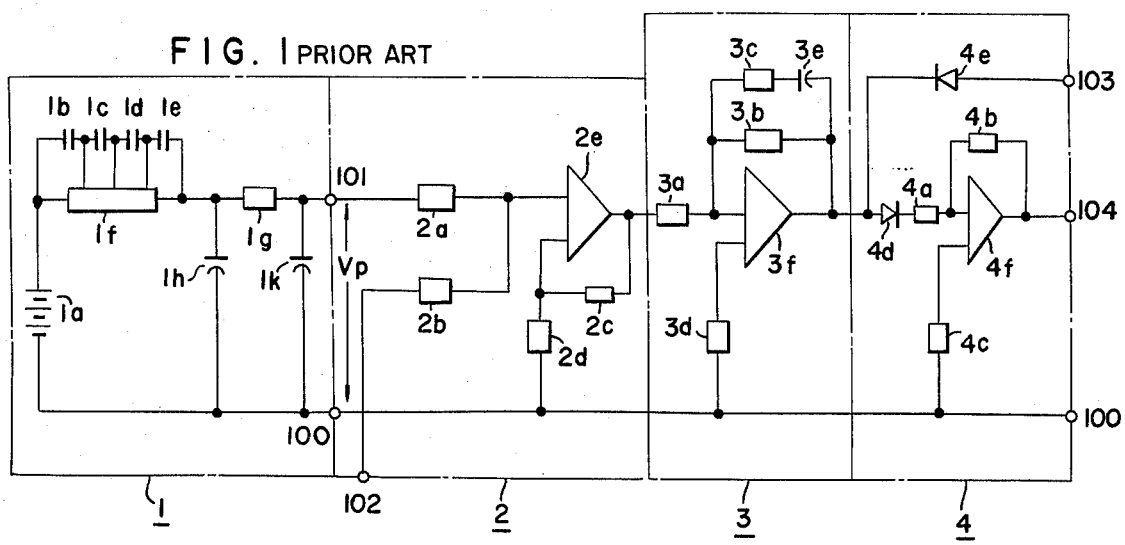
FIG. 1 is a block diagram representative of the prior art which shows a device which generates an elevator speed command signal, and a computing device.
Figure 3:
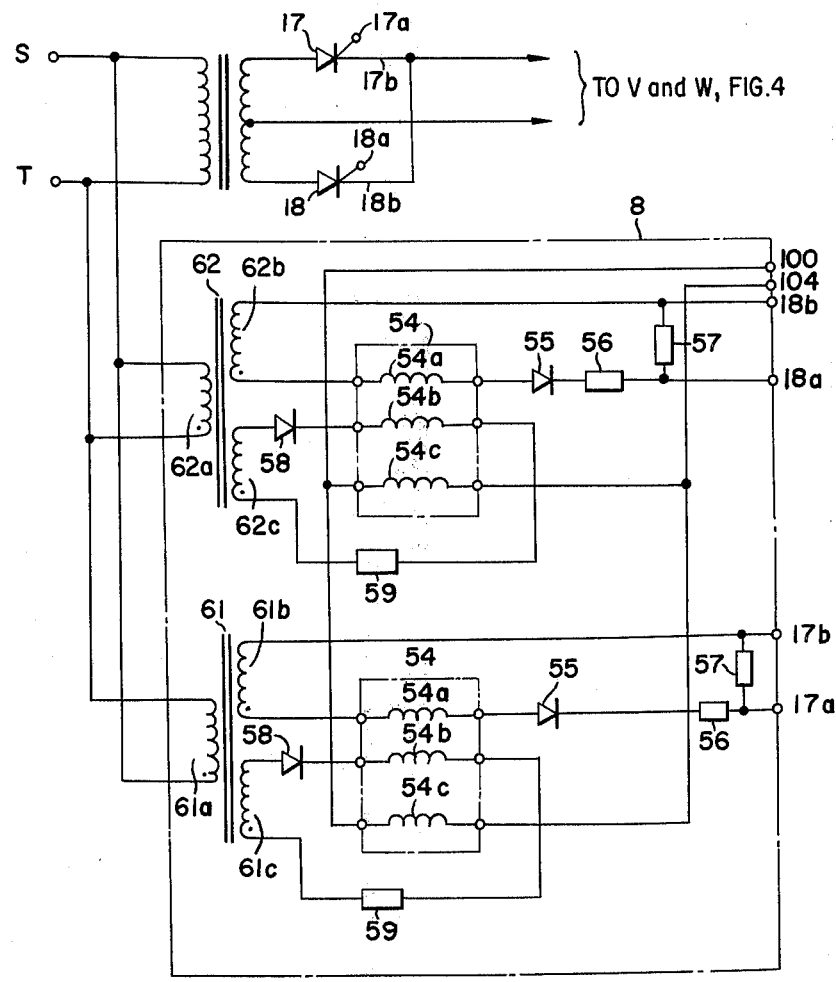
FIG. 3 is a prior art circuit diagram showing thyristor circuits used to control the voltage applied to an induction motor for the elevator while in a braking operation, power transformers, and turn-on control circuits of the thyristors.
Figure 2:
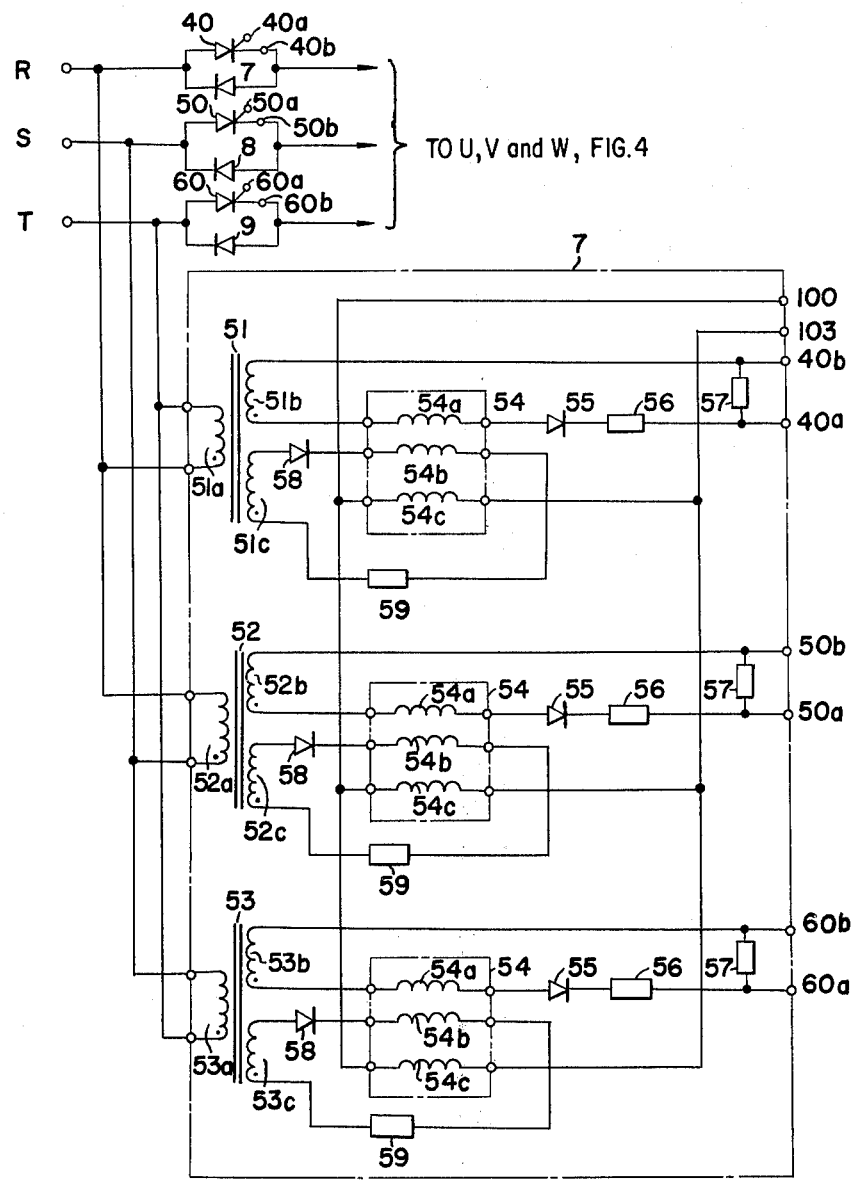
FIG. 2 is also a prior art circuit diagram showing thyristor circuits used to control the voltage applied to an induction motor for an elevator while power-running, and turn-on control circuits for such thyristors.
Figure 4:
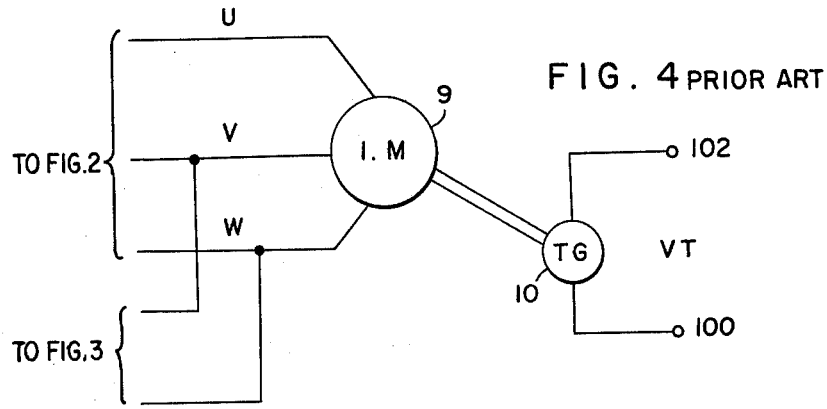
FIG. 4 is a prior art schematic diagram showing an induction motor and a device for transducing the rotational speed of the motor into a voltage.
Figure 5:
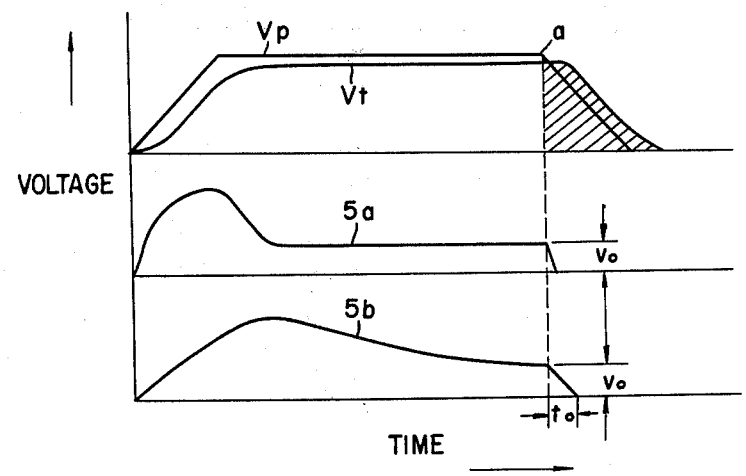
FIGS. 5 and 6 are diagrams useful for illustrating the operation of the elevator under the control of the devices shown in FIGS. 1–4.
Figure 6:
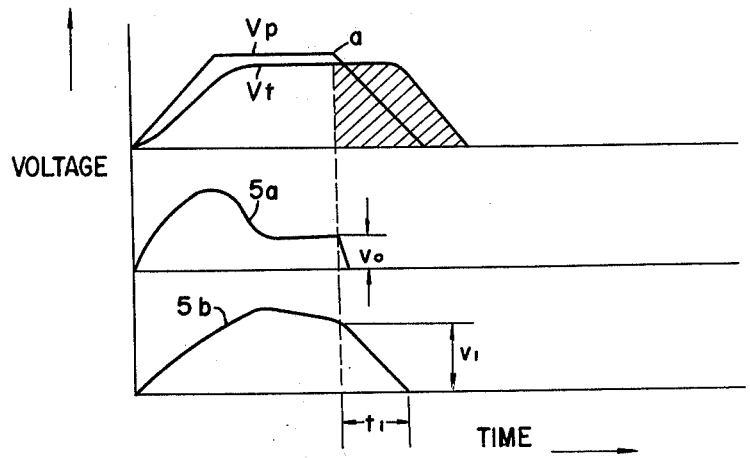

In operation, when the voltage being applied to the motor reaches its rated value and the rotating torque of the motor becomes equal to that of the load, the motor runs at a given speed and the cage speed becomes constant. At this moment, a rated voltage is applied to the motor under the control of saturation signal generating device 12. When the cage reaches the deceleration decision point $b$ while moving towards the deceleration command point, as seen in FIG. 8, the operation relay is energized and the contact 11$g$ is closed. In this condition, the transfer characteristic of the amplifier 11 assumes the value $R_3/R_1$ from equation (1) and thereby possesses no frequency characteristic. The capacitor 11f becomes charged with a voltage corresponding to the signal 5b, as seen in FIG. 8. Then, if $R_3 = R_1$, the voltage of signal 5b will be $V_o$ since the signal 5a has a value of $V_o$. When the cage reaches the deceleration command point a, the contact 11g is opened and the saturation signal becomes zero. As a consequence, the motor is connected into the control system once again, and the deceleration of the cage begins in the manner as described hereinbefore with reference to FIG. 5, $t_o$ seconds after the deceleration command point a. At this point, the capacitor 11f is charged to the voltage $V_o$ of the signal 5b to keep the signal 5b from becoming discontinuous when the contact 11g is opened.

FIG. 9 schematically illustrates the operation wherein the cage begins decelerating upon reaching a given speed. When the cage reaches the deceleration decision point b, the contact 11g is closed and the frequency characteristic of the amplifier 11 is cancelled, to immediately cause the signal 5b to attain the same voltage as the signal 5a. The two signals each equal the voltage $V_o$ at the deceleration command point a. At this moment, the frequency characteristic is restored. The deceleration starts $t_o$ seconds after the deceleration command point a and continues in the same fashion as shown in FIG. 8. In other words, according to the present invention, the cage can be decelerated under the same deceleration characteristic, regardless of whether the deceleration begins after the cage has been run at a constant speed for a substantial length of time, or if it is started immediately when the cage reaches a given speed. Thus, the cage can be accurately leveled to its correct position at all times.

In the foregoing embodiment, a rated voltage is applied to the motor at the time the cage reaches a given speed. The invention is not, however, limited to this timing, and the rated voltage may be applied within the certain period which terminates at the deceleration decision point b within the scope of the present invention.

As described above, the control system should be saturated beforehand by the saturation signal in order to thoroughly cancel the frequency characteristic. (Note: A control system will become unstable if the frequency characteristic is cancelled before the control system is saturated.) However, the control system is not necessarily saturated with the saturation signal when the control system comprises a plurality of devices each having a frequency characteristic and can maintain stability against cancellation of some of these frequency characteristics.

According to the present invention, as has been described above in detail, the frequency characteristic in the control system is cancelled before the cage is decelerated, and the output of the device which has the frequency characteristic is set to a value corresponding to its input whereby the deceleration characteristic of the cage is maintained constant regardless of the operating hysteresis of the cage and thus the cage can be accurately stopped in the desired position at all times.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent in the United States is:

1. Apparatus for controlling an elevator cage driven through an induction motor comprising:
   means for generating a speed command signal;
   means for generating an actual speed signal,
   means for comparing the speed command signal and the actual speed signal to generate a resultant difference signal;
   a delay characteristic circuit having first switch means therein for applying a delay characteristic to the resultant difference signal when the first switch means is in a first state and for applying no delay characteristic to the resultant difference signal when the first switch means is in a second state;
   a saturation signal generating circuit having its input connected to the output of the delay characteristic circuit and having second switch means therein for generating a saturation signal to be applied to a distribution circuit when the second switch means is in a first state and for applying the output of the delay characteristic circuit to the distribution circuit when the second switch means is in a second state,
   the first switch means being switched from its first state to its second state at a given deceleration decision point and being switched from its second state to its first state upon reaching a deceleration command point,
   the second switch means being switched from its second state to its first state after the end of acceleration and being switched from its first state to its second state at the beginning of deceleration.

2. Apparatus for controlling an elevator cage driven by an induction motor in accordance with claim 1 wherein the second switch means is switched from its second state to its first state immediately after the end of acceleration.

* * * * *